US007826955B2

(12) United States Patent
Shinogi

(10) Patent No.: US 7,826,955 B2
(45) Date of Patent: Nov. 2, 2010

(54) GENERAL-PURPOSE INTERNAL COMBUSTION ENGINE

(75) Inventor: Yoshihisa Shinogi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 313 days.

(21) Appl. No.: 12/079,054

(22) Filed: Mar. 24, 2008

(65) Prior Publication Data

US 2008/0243359 A1 Oct. 2, 2008

(30) Foreign Application Priority Data

Mar. 30, 2007 (JP) ............................ 2007-090769

(51) Int. Cl.
*G06F 19/00* (2006.01)
*G06F 11/30* (2006.01)
*B60Q 1/00* (2006.01)

(52) U.S. Cl. ....................... 701/102; 701/115; 702/183; 340/438

(58) Field of Classification Search ......... 123/478–480, 123/196 R, 196 S, 198 D; 340/438, 439, 340/459; 701/36, 101–103, 114, 115; 702/182–185; 73/114.01, 114.13, 114.56, 114.57; 200/1 R; 290/1 A, 40 R
See application file for complete search history.

(56) References Cited

U.S. PATENT DOCUMENTS

| | | | | |
|---|---|---|---|---|
| 4,212,016 | A * | 7/1980 | Ruhl | 346/62 |
| 4,481,585 | A * | 11/1984 | Huntzinger et al. | 701/36 |
| 5,159,313 | A * | 10/1992 | Kawai et al. | 340/450.3 |
| 6,646,561 | B1 * | 11/2003 | Zur et al. | 340/636.12 |
| 6,868,832 | B2 * | 3/2005 | Tamechika et al. | 123/478 |
| 6,894,403 | B2 * | 5/2005 | Shinogi | 290/40 R |
| 7,305,325 | B2 * | 12/2007 | Kostyk et al. | 702/183 |
| 7,458,255 | B2 * | 12/2008 | Shinogi et al. | 73/114.01 |

FOREIGN PATENT DOCUMENTS

| | | |
|---|---|---|
| JP | 05-032090 U | 4/1993 |

* cited by examiner

*Primary Examiner*—Willis R Wolfe, Jr.
(74) *Attorney, Agent, or Firm*—Carrier, Blackman & Associates P.C.; William D. Blackman; Joseph P. Carrier

(57) ABSTRACT

In a general-purpose internal combustion engine connectable to operating machines such as a snowplow, a washing machine and a wood chipper having an electronic control unit that controls operation of the operating machine when connected, there are provided a signal output terminal that is installed in the electronic control unit and outputs a signal generated by the electronic control unit to the operating machine and a signal selector constituted by a personal computer that selects a signal to be outputted by the signal output terminal from among signals in response to manipulation by an operator. The engine can be easily connected with any operating machine without a complicated electronic control unit, thereby improving versatility and convenience.

6 Claims, 5 Drawing Sheets

GENERAL-PURPOSE INTERNAL COMBUSTION ENGINE

CROSS REFERENCE TO RELATED APPLICATIONS

The present application claims priority under 35 USC 119 based on Japanese Patent Application JP2007-090769 filed on Mar. 30, 2007, the entire content of the priority document is incorporated herein by reference.

BACKGROUND OF THE INVENTION

1. Field of the Invention

This invention relates to a general-purpose internal combustion engine, particularly to a general-purpose internal combustion engine that is improved in versatility and convenience.

2. Description of the Related Art

Conventionally, there is proposed a general-purpose internal combustion engine equipped with an electronic control unit for controlling operation and a signal output terminal for outputting signals produced by the electric control unit to an operating machine, and configured to output the produced signal (e.g., oil alert signal that is outputted when the oil level is at or below a predetermined level) through the signal output terminal to an indicator lamp to light it up for alerting the operator, as taught, for example, in Japanese Laid-Open Utility Model Application No. Hei 5 (1993)-32090.

SUMMARY OF THE INVENTION

A general-purpose internal combustion engine is connected to various types of operating machines such as a snowplow, high-pressure washing machine etc. In such an operating machine, the engine start is discriminated by, for instance, detecting an ignition signal. Also load condition, specifically, overload of the engine is discriminated based on acceleration of the engine. Therefore, when a general-purpose internal combustion engine is connected to an operating machine, a complicated electronic control unit, e.g., electronic control unit complicated in structure to be capable of detecting the engine start using an ignition signal and detecting load condition from acceleration of the engine speed, is required and is disadvantageous.

An object of this invention is therefore to overcome the foregoing problem by providing a general-purpose internal combustion engine that can be easily connected with an operating machine without a complicated electronic control unit, thereby improving versatility and convenience.

In order to achieve the object, this invention provides a general-purpose internal combustion engine connectable to an operating machine and having a cylinder in which a piston reciprocates to rotate a crankshaft in a crankcase where lubricant oil is retained and a throttle valve for regulating air to be sucked into the cylinder, comprising: an electronic control unit that controls operation of the operating machine when connected; a signal output terminal that is installed in the electronic control unit and outputs a signal generated by the electronic control unit to the operating machine, and a signal selector that selects a signal to be outputted by the signal output terminal from among signals in response to manipulation by an operator.

BRIEF DESCRIPTION OF THE DRAWINGS

The above and other objects and advantages of the invention will be more apparent from the following description and drawings in which.

DETAILED DESCRIPTION OF THE PREFERRED EMBODIMENT

A general-purpose internal combustion engine according to a preferred embodiment of the present invention will now be explained by way of example and with reference to the attached drawings.

Figure 1:
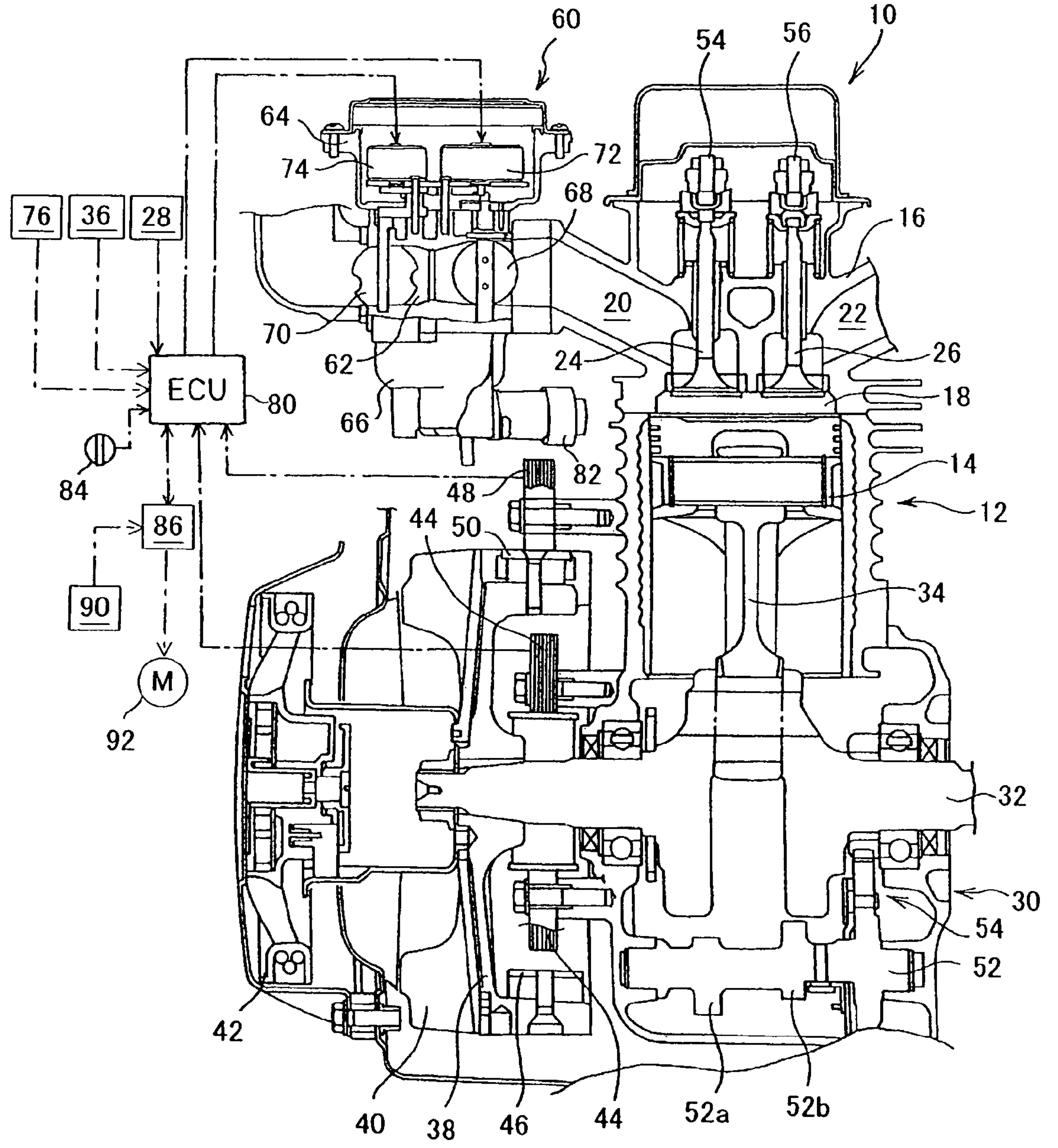
FIG. 1 is an overall view of a general-purpose engine according to an embodiment of this invention.

FIG. 1 is an overall view of a general-purpose internal combustion engine according to an embodiment of this invention.

In FIG. 1, reference numeral 10 designates a general-purpose internal combustion engine (hereinafter referred to as "engine"). The engine 10 is a single-cylinder, air-cooled, four-cycle, OHV engine with a displacement of, for example, 440 cc. As explained later, the engine 10 is used as a prime mover in a snowplow, high-pressure washing machine or various other operating machines.

The engine 10 has a cylinder (cylinder block) 12 accommodating a piston 14 that reciprocates in the cylinder 12. A cylinder head 16 is attached to the top of the cylinder 12. The cylinder head 16 is formed with a combustion chamber 18 facing the crown of the piston 14, and equipped with an intake port 20 and exhaust port 22 that communicate with the combustion chamber 18. The cylinder head 16 is provided with an intake valve 24 that opens and closes communication between the combustion chamber 18 and the intake port 20, and an exhaust valve 26 that opens and closes communication between the combustion chamber 18 and the exhaust port 22. The cylinder head 16 is also provided with a temperature sensor 28 that produces an output or signal indicating the temperature of the engine 10.

A crankcase 30 is attached to the cylinder 12. A crankshaft (output shaft) 32 is installed in the crankcase 30 to be rotatable therein. The crankshaft 32 is connected to the piston 14 through a connecting rod 34. The lower portion of crankcase

30 forms an oil pan for retaining lubricant oil, where an oil-level switch 36 is installed. The switch 36 generates an ON signal in response to the level of lubricant oil in the crankcase 30, i.e., it generates an ON signal when the oil level is equal to or less than a predetermined level, i.e., when it is insufficient.

One end of the crankshaft 32 is connected with an operating machine or a load (not shown) and the other end thereof is attached with a flywheel 38, cooling fan 40 and recoil starter 42. When the recoil starter 42 is pulled by the operator, it starts the engine 10.

The flywheel 38 is shaped like a cup and a magnet 46 is attached to the inner surface of the flywheel. The power coil 44 is attached on the engine body at a position inside the rotating flywheel 38. The power coil 44 and magnet 46 constitute a multi-polar generator that produces an alternating current output synchronous with rotation of the crankshaft 32.

A pulsar coil 48 is attached to the engine body at a position outside the flywheel 38. The pulsar coil 48 produces an output or signal indicating the ignition timing of the engine 10 every time the magnet 50 attached on the outer peripheral surface of the flywheel 38 passes by. Although omitted in FIG. 1, a coil for fuel-cut solenoid valve (FS coil) is attached to the engine body together with the power coil 44 inside the flywheel 38. The FS coil also produces an alternating current output synchronous with rotation of the crankshaft 32.

A camshaft 52 is also installed in the crankcase 30 to be rotatable therein. The camshaft 52 is aligned in parallel with the axis of the crankshaft 32 and is connected to the crankshaft 32 through a gear mechanism 54. The camshaft 52 is equipped with an intake side cam 52*a* and an exhaust side cam 52*b* and operates the intake valve 24 and exhaust valve 26 to open and close through push rods (not shown) and rocker arms 54, 56.

A carburetor 60 is connected to the intake port 20. The carburetor 60 unitarily comprises an air intake passage 62, motor case 64 and carburetor assembly 66. The air intake passage 62 is installed with a throttle valve 68 and choke valve 70.

An electric throttle motor 72 for opening and closing the throttle valve 68 and an electric choke motor 74 for opening and closing the choke valve 70 are housed in the motor case 64. The throttle motor 72 and choke motor 74 are stepper motors each comprising a stator wound with a coil and a rotor. A throttle opening sensor 76 is installed near the throttle valve 68 to produce an output or signal in response to an opening of the throttle valve 68 (hereinafter called "throttle opening θTH").

The operation of the throttle motor 72 and choke motor 74 is controlled by an electronic control unit (ECU) 80 constituted as a microcomputer.

The carburetor assembly 66 is connected to a fuel tank (not shown) to be supplied with fuel and injects fuel of an amount corresponding to opening of the throttle valve 68 and choke valve 70, thereby producing air-fuel mixture. Reference numeral 82 in FIG. 1 designates the aforesaid fuel-cut solenoid valve. When the FS coil (shown in FIG. 2 explained below) is energized, the fuel-cut solenoid valve 82 closes to block the fuel supply from the fuel tank.

The air-fuel mixture produced in the carburetor 60 passes through the intake port 20 and intake valve 24 to be sucked into the combustion chamber 18. The air-fuel mixture sucked into the combustion chamber 18 is ignited by a spark plug (shown in FIG. 2) and burns. The resulting combustion gas is discharged to the exterior of the engine 10 through the exhaust valve 26, exhaust port 22, a muffler (not shown) and the like.

A speed setting knob 84 and combination switch 86 are installed at locations to be operated by the operator. The speed setting knob 84 produces an output or signal indicative of a desired engine speed set by the operator. The outputs of the aforementioned temperature sensor 28, oil-level switch 36, power coil 44, pulsar coil 48, throttle opening sensor 76 and speed setting knob 84 are sent to the ECU 80.

A battery 90 and starter motor 92 are provided to the engine 10. The battery 90 is connected via the combination switch 86 to the ECU 80 and starter motor 92 to supply direct current of 12V thereto.

Figure 2:
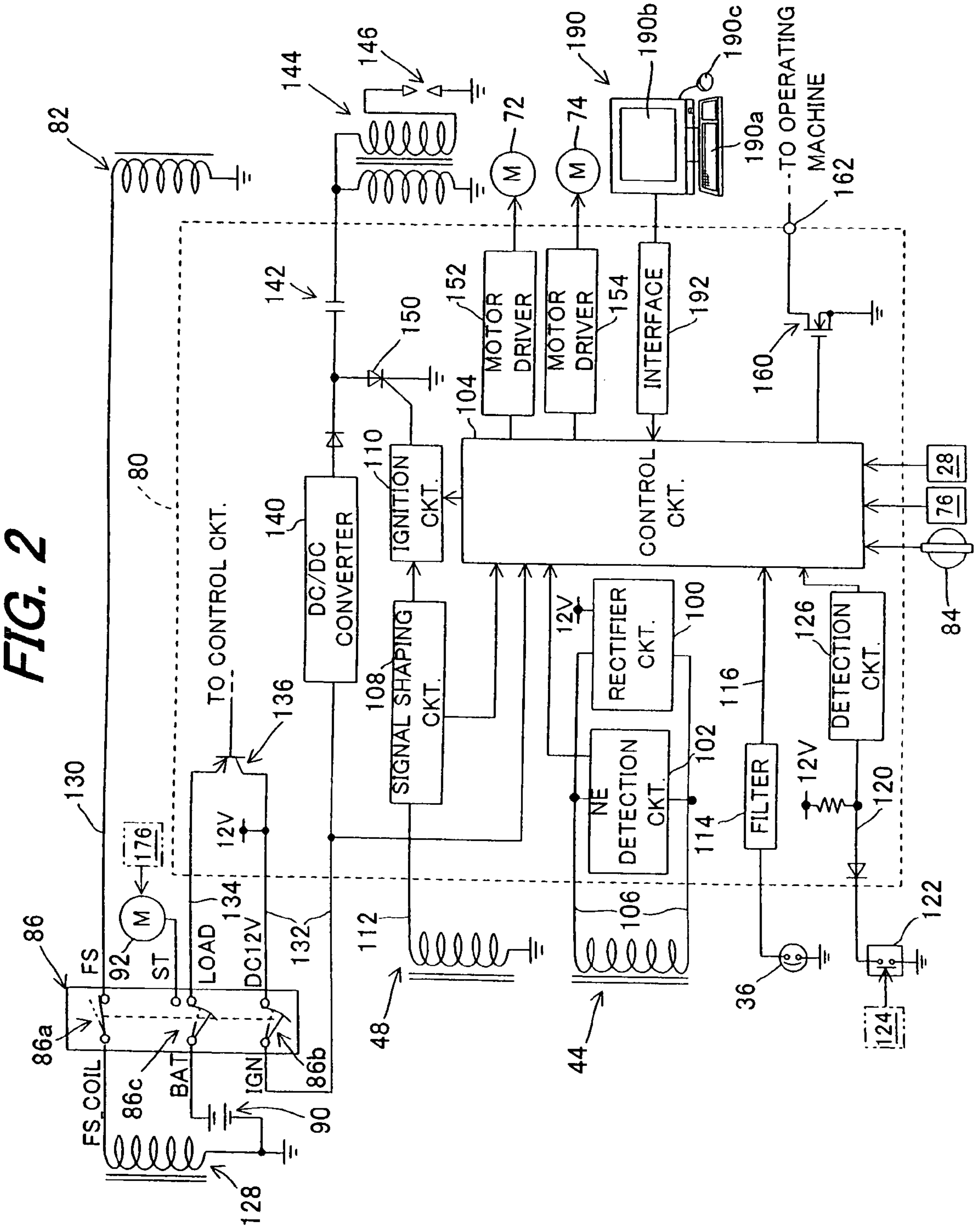
FIG. 2 is an explanatory view showing the structure of an ECU etc. shown in FIG. 1.

FIG. 2 is an explanatory view showing the structure of the ECU 80 etc. shown in FIG. 1.

As shown in FIG. 2, the ECU 80 comprises a rectifier circuit 100, NE (engine speed) detection circuit 102 and control circuit (constituted by Central Processor Unit) 104. The output of the power coil 44 is forwarded through a conductor 106 to the rectifier circuit 100 of the ECU 80, where it is converted to the 12 V direct current through full-wave rectification or the like.

The output of the power coil 44 is also sent to the NE detection circuit 102, where it is converted to a pulse signal through half-wave rectification or the like. The pulse signal generated by the NE detection circuit 102 is inputted to the control circuit 104. The frequency of the alternating current generated by the power coil 44 is proportional to the number of rotations per unit time of the crankshaft 32. The control circuit 104 can therefore use the pulse signal converted from the output of the power coil 44 to detect or determine the engine speed.

The ECU 80 is further equipped with a signal shaping circuit 108 and an ignition circuit 110. The output of the pulsar coil 48 is sent through a conductor 112 to the signal shaping circuit 108, where it is used to generate an ignition signal synchronous with the rotation of the crankshaft 32. The ignition signal generated by the signal shaping circuit 108 is sent to the ignition circuit 110 and control circuit 104.

The ECU 80 is provided with a filter 114 that removes noise. The output (ON/OFF signal) of the oil-level switch 36 is forwarded through a conductor 116 and the filter 114 to the control circuit 104. When the oil-level switch 36 outputs the ON signal, specifically, when the oil level is equal to or less than the predetermined level, the control circuit 104 produces an oil alert signal.

The control circuit 104 is connected to a switch 122 through a conductor 120. The switch 122 is connected to a start instruction sensor 124 (indicated by the imaginary line in FIG. 2) installed at, for instance, a trigger of a washing gun of a high-pressure washing machine, which will be explained later. The start instruction sensor 124 produces an ON signal when the trigger is pulled by the operator to input an instruction to start the engine 10, and produces an OFF signal when it is not manipulated. The switch 122 is turned ON in response to the ON signal inputted from the start instruction sensor 124, while turned OFF in response to the OFF signal therefrom.

The conductor 120 is disposed with a detection circuit 126 at a location between the switch 122 and control circuit 104 for detecting ON/OFF state of the switch 122. Specifically, as shown in the figure, the detection circuit 126 is supplied with the 12 V direct current through the conductor 120 and is grounded when the switch 122 is turned ON. The detection circuit 126 detects this and produces an output or signal indicating that the switch 122 has been turned ON. The produced signal is sent to the control circuit 104. When the detection circuit 126 outputs the signal, i.e., when the start instruction is inputted, the control circuit 104 produces an engine start signal. The engine start signal and oil alert signal produced by the control circuit 104 of the ECU 80 will be explained later.

As shown, the combination switch 86 is equipped with first to third switches 86*a*, 86*b*, 86*c*. The first switch 86*a* is disposed in a conductor 130 interconnecting the FS coil 128 and the fuel-cut solenoid valve (precisely, a coil thereof) 82 for enabling or disabling flow of current through the conductor 130. The second switch 86*b* is disposed in a conductor 132 for enabling or disabling flow of current through the conductor 132. The third switch 86*c* disposed in a conductor 134 enables or disables flow of current through the conductor 134.

The battery 90 is connected via the conductor 134 with the emitter terminal of a PNP transistor 136 provided at the ECU 80. The base terminal of the transistor 136 is connected to the control circuit 104 and the collector terminal thereof to the conductor 132.

The 12 V direct current supplied by the battery 90 or generated from the output of the power coil 44 passes out of the ECU 80 and is then returned thereto through the conductor 132 and the second switch 86*b*. The current returning to the ECU 80 is applied to the control circuit 104 and a DC/DC converter 140. The 12 V direct current supplied by the battery 90 or generated from the output of the power coil 44 is converted to 5 V direct current in another circuit (not shown) and this 5 V direct current is supplied to the control circuit 104 as operating current.

The DC/DC converter 140 boosts or steps up the voltage of the current supplied thereto to charge a capacitor 142 with the boosted current. The capacitor 142 is connected to the primary coil of an ignition coil 144. The secondary coil of the ignition coil 144 is connected to a spark plug 146. The circuit connecting the DC/DC converter 140 to the capacitor 142 is grounded through a thyristor 150.

The ignition circuit 110 applies current to the gate terminal of the thyristor 150 in response to the ignition signal inputted from the signal shaping circuit 108 or control circuit 104. The capacitor 142 therefore discharges the stored energy through the primary coil of the ignition coil 144 and the resulting high voltage generated across the secondary coil causes the spark plug 146 to spark.

The control circuit 104 is connected with the temperature sensor 28, throttle opening sensor 76 and speed setting knob 84. Based on the outputs from the temperature sensor 28, throttle opening sensor 76, speed setting knob 84 and NE detection circuit 102, the control circuit 104 determines desired openings of the throttle valve 68 and choke valve 70, and based on the determined desired openings, produces and sends control signals to motor drivers 152, 154 to operate the throttle motor 72 and choke motor 74, thereby opening and closing the valves 68, 70 to regulate the engine speed. The control circuit 104 controls such that the throttle opening θTH increases with increasing load of the engine 10 (load affected by the operating machine) in order to maintain the set engine speed. Therefore, as will be explained later, it is possible to determine that the engine 10 is in overload at the time when the throttle opening θTH is equal to or greater than a predetermined opening limit. The control circuit 104 also controls the ignition timing and other operations based on the several inputs.

The operator can set the combination switch 86 to one from among a start position, ON position and OFF position as desired. In FIG. 2, the solid lines indicate the state of the first to third switches 86*a*, 86*b*, 86*c* when the combination switch 86 is in the OFF position and the imaginary lines indicate their state when it is in the ON position.

When the combination switch 86 is put in the ON position, the first switch 86*a* is turned OFF to cut off the supply of operating current to the fuel-cut solenoid valve 82. The fuel-cut solenoid valve 82 is normally opened, so that cutting off the supply of operating current thereto enables jetting of fuel from the carburetor 60. The second switch 86*b* is turned ON to pass current through the conductor 132.

The third switch 86*c* is turned ON to pass current from the battery 90 to the emitter terminal of the transistor 136. As a result, the 12V direct current is supplied from the battery 90 to the ignition system, i.e., the DC/DC converter 140, capacitor 142 and the like, and the control circuit 104 through the conductor 134 (switch 86*c*), transistor 136 and conductor 132 (switch 86*b*). The 5 V direct current (operating current) is also supplied from the battery 90 to the control circuit 104 through another circuit (not shown).

When the combination switch 86 is put to the start position over the ON position, operating current is supplied from the battery 90 to the starter motor 92 through the third switch 86*c*. The starter motor 92 is activated by the operating current and starts the engine 10.

When start of the engine 10 is detected from the engine speed and the like, the control circuit 104 turns the transistor 136 OFF to cut off the supply of current from the battery 90. It results in the switching of the supply source of 12 V direct current to the ignition system and control circuit 104 and that of 5 V direct current (operating current) to the control circuit 104 from the battery 90 to the power coil 44.

When the combination switch 86 is put in the OFF position, the second switch 86*b* is turned OFF to cut off the supply of the 12V direct current through the conductor 132. When the current inputted through the conductor 132 is cut off, the control circuit 104 terminates ignition to stop the engine 10. In addition, putting the combination switch 86 in the OFF position turns the first switch 86*a* ON to interconnect the FS coil 128 and the fuel-cut solenoid valve 82. The FS coil 128 continues to generate electricity even after ignition is terminated because rotation of the crankshaft 32 does not stop immediately. The fuel-cut solenoid valve 82 therefore continues to receive operating current from the FS coil 128 for a certain period of time after the combination switch 86 is put in the OFF position and closes. Ignition cutoff and fuel cutoff are consequently performed simultaneously.

The ECU 80 is further equipped with an FET (field-effect transistor) 160 and a signal output terminal 162 that can output signals (e.g., oil alert signal) produced by the ECU 80 to the operating machine. The signal output terminal 162 can be connected to various operating machines.

As shown in FIG. 2, a gate terminal of the FET 160 is connected to the control circuit 104. The source terminal of the FET 160 is grounded and the drain terminal thereof is connected through the signal output terminal 162 to the operating machine, e.g., an indicator lamp of a snowplow which will be explained later. The FET 160 is turned ON when voltage is applied to its gate terminal by the control circuit 104 of the ECU 80, and is turned OFF when it is not applied. As a result, the signal output terminal 162 or the operating machine connected thereto is grounded when the FET 160 is turned ON, and is opened or disconnected when the FET 160 is turned OFF. Voltage drop of the FET 160 is set at 1.5 V (drain current 0.5 A) at a maximum.

Next, the connection of the engine 10 with the operating machine will be explained. It should be noted that, in this embodiment, a snowplow, high-pressure washing machine and wood chipper are taken as examples of the operating machine connected to the engine 10. The following explanation will be made with focus on the connection of the signal output terminal 162 of the engine 10 with the operating machine, and the other connections, such as a connection between the crankshaft 32 of the engine 10 and the operating machine, are neither explained nor illustrated here, since it is not directly related to the gist of this invention.

Figure 3:
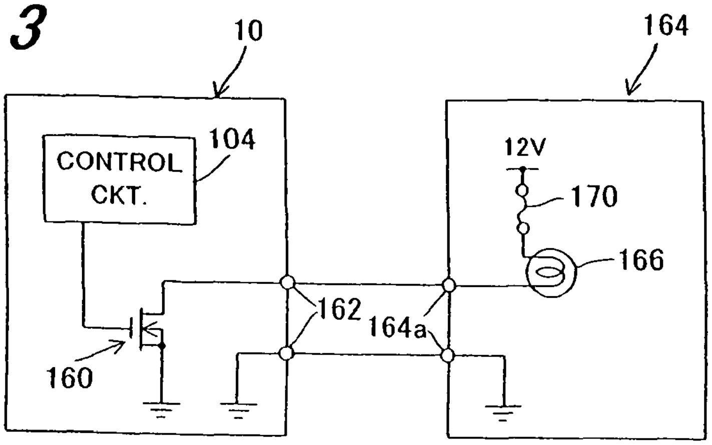
FIG. 3 is an explanatory view showing the configuration in the vicinity of a signal output terminal when the engine shown in FIG. 1 is connected to a snowplow.

FIG. 3 is an explanatory view showing the configuration in the vicinity of the signal output terminal 162 when the engine 10 is connected to a snowplow.

In FIG. 3, reference numeral 164 designates the snowplow. The snowplow 164 is equipped with an indicator lamp 166 at a position where the operator can visually check. The indicator lamp 166 is connected to a supply source of the 12 V direct current, i.e., operating current through a fuse 170. The indicator lamp 166 of the snowplow 164 thus constituted is connected to the signal output terminal 162 of the engine 10 through a signal input terminal 164*a*. With this configuration, the indicator lamp 166 is lit when the FET 160 is turned ON to pass the current, and extinguished when the FET 160 is turned OFF to block the current.

Figure 4:
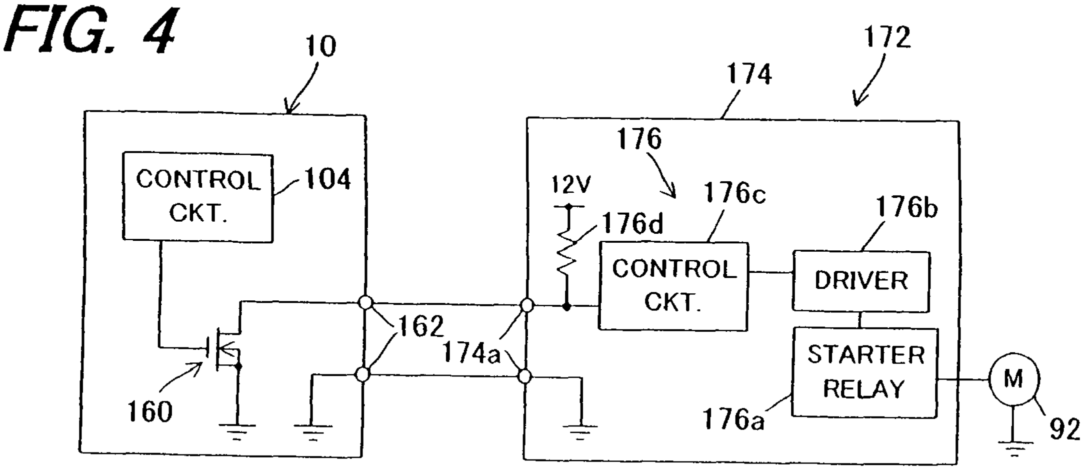
FIG. 4 is an explanatory view similar to FIG. 3 but showing the configuration in the vicinity of the signal output terminal when the engine shown in FIG. 1 is connected to a high-pressure washing machine.

FIG. 4 is an explanatory view showing the configuration in the vicinity of the signal output terminal 162 when the engine 10 is connected to a high-pressure washing machine.

The washing machine 172 is equipped with a main body 174 having a pump (not shown) driven by the engine 10 and the like and with a washing gun (not shown) for jetting water pressurized by the pump. The main body 174 includes a so-called auto-start system 176 that automatically starts the engine 10 in response to a start instruction inputted by the operator. The auto-start system 176 comprises a starter relay 176*a* for operating the starter motor 92, a driver 176*b* for driving the starter relay 176*a* and a control circuit 176*c* for controlling the operation of the driver 176*b*. The control circuit 176*c* is supplied with the 12 V direct current through a resistor 176*d*.

As illustrated, the control circuit 176*c* is connected to the signal output terminal 162 of the engine 10 through a signal input terminal 174*a*. Since the control circuit 176*c* is grounded in response to turning ON of the FET 160, based thereon the status (specifically, ON/OFF) of the FET 160 can be detected. When the FET 160 is turned ON, the control circuit 176*c* operates the starter motor 92 through the driver 176*b* and starter relay 176*a* to start the engine 10.

Figure 5:
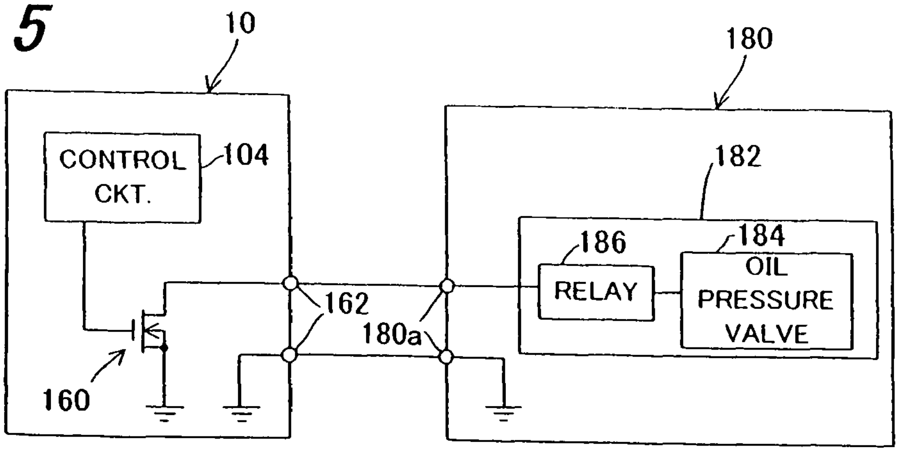
FIG. 5 is an explanatory view similar to FIG. 3 but showing the configuration in the vicinity of the signal output terminal when the engine shown in FIG. 1 is connected to a wood chipper.

FIG. 5 is an explanatory view showing the configuration in the vicinity of the signal output terminal 162 when the engine 10 is connected to a wood chipper.

The wood chipper 180 is equipped with a feeder 182 for feeding and sending wood by using a roller to a crushing cutter which rotates (none of which are shown), and other components. The feeder 182 is composed of an oil pressure valve 184 for operating the roller and a relay 186 for controlling the operation of the oil pressure valve 184.

The relay 186 is connected to the signal output terminal 162 of the engine 10 through a signal input terminal 180*a*. The relay 186 is operated in response to turning ON/OFF of the FET 160. Specifically, when the FET 160 is turned ON, the relay 186 operates the oil pressure valve 184 to stop the rotation of the roller, i.e., stop feeding wood, and when the FET 160 is turned OFF, the relay 186 operates the oil pressure valve 184 to rotate the roller, thereby feeding wood.

The explanation of FIG. 2 will be resumed.

The ECU 80 is equipped with an interface 192 that is connectable to an external terminal 190 or the like. The external terminal 190 constituting a personal computer is provided with a keyboard 190*a* operable by the operator, a display 190*b* and a mouse 190*c*. The external terminal 190 is installed with software (external software) for selecting a signal to be outputted through the signal output terminal 162 from among a plurality of predetermined signals, i.e., the oil alert signal, engine start signal and an overload signal (explained later) generated by the ECU 80, and an image used for selecting the signal is displayed on the display 190*b*.

Figure 6:
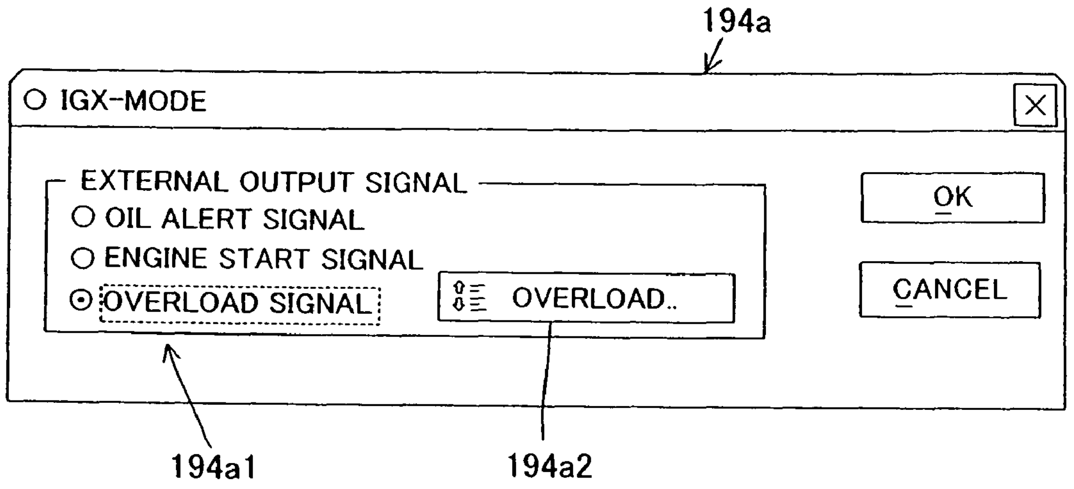
FIG. 6 is an explanatory view showing an image on a display (main panel) of an external terminal shown in FIG. 2.

FIG. 6 is an explanatory view showing the image on the display 190*b*.

As shown in FIG. 6, a main panel 194*a* is shown on the display 190*b*. In the main panel 194*a*, a plurality of, i.e., three descriptions 194*a*1 indicate the signals (EXTERNAL OUTPUT SIGNAL) to be outputted from the signal output terminal 162. Specifically, the descriptions of "OIL ALERT SIGNAL," "ENGINE START SIGNAL" and "OVERLOAD SIGNAL" are displayed in the main panel 194*a* so as to be selectable by the operator.

An overload setting button 194*a*2 is displayed near the description of "OVERLOAD SIGNAL." As explained in the foregoing, the overload of the engine 10 is determined by comparing the throttle opening θTH with the predetermined opening limit. The overload setting button 194*a*2 is used for setting or changing the predetermined opening limit. When the operator clicks the overload setting button 194*a*2, a sub panel 194*b* appears on the display 190*b*.

Figure 7:
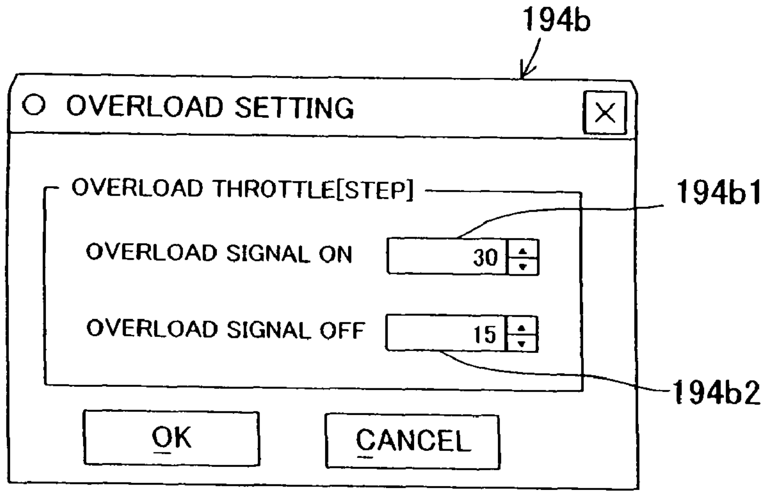
FIG. 7 is an explanatory view similar to FIG. 6 but showing an image on a display (sub panel) of the external terminal shown in FIG. 2.

FIG. 7 is an explanatory view showing the sub panel 194*b* on the display 190*b*.

As shown in FIG. 7, a plurality of, i.e., two input boxes, more specifically first and second input boxes 194*b*1, 194*b*2 to be inputted with the predetermined opening limits are displayed in the sub panel 194*b*. More specifically, the input boxes 194*b*1, 194*b*2 are inputted with the numbers of steps of the throttle motor 72. Since the throttle motor 72 comprises a stepper motor, the number of steps is proportional to the throttle opening and inputting the number of steps therefore corresponds to inputting the throttle opening limits.

The first input box 194*b*1 is inputted by the operator with the number of steps (hereinafter called "first predetermined step reference STEPREF1") corresponding to a value of the throttle opening with which the occurrence of overload of the engine 10 can be discriminated, and the second input box 194*b*2 is inputted with the number of steps (hereinafter called "second predetermined step reference STEPREF2") corresponding to a value of the throttle opening with which it can be discriminated that no overload arises in the engine 10. The predetermined opening limits (first and second predetermined step references STEPREF1, STEPREF2) used for discriminating the occurrence of the overload of the engine 10 can be changed by the operator.

The signal selected by the operator to be outputted from the signal output terminal 162 and the first and second predetermined step references STEPREF1, STEPREF2 are forwarded to the control circuit 104 of the ECU 80 through the interface 192. Based on the inputted first predetermined step reference STEPREF1 and other inputs, the control circuit 104 determines whether the engine 10 is in overload. Specifically, the control circuit 104 determines whether the throttle opening θTH is equal to or greater than the predetermined opening limit, i.e., whether the overload arises, by comparing the current number of steps of the throttle motor 72 with the first predetermined step reference STEPREF1.

Explaining the above using an example shown in FIG. 7, the control circuit 104 of the ECU 80 determines that the engine 10 is in overload and generates the overload signal when the number of steps of the throttle motor 72 is equal to or greater than 30 [step], and does not generate the overload signal when the number is equal to or less than 15 [step].

Next, a signal outputted from the signal output terminal 162 of the engine 10 thus constituted will be explained with reference to FIG. 8.

Figure 8:
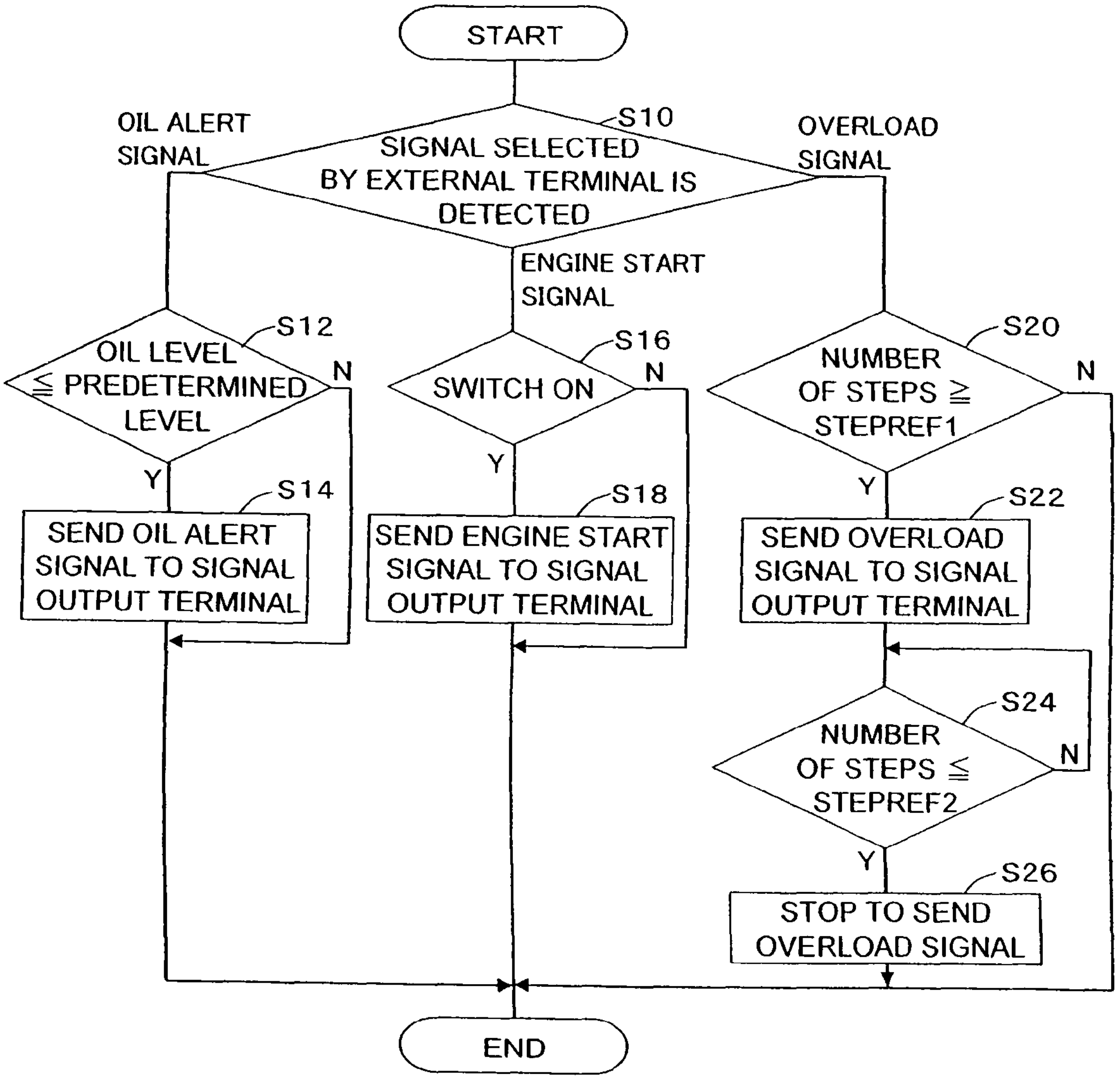
FIG. 8 is a flowchart showing the operation of the engine, more particularly the ECU shown in FIG. 1.

FIG. 8 is a flowchart showing the operation of the engine 10, more specifically the ECU 80.

In step S10, a signal selected by the operator using the external terminal 190 is detected, specifically, a signal selected to be outputted by the signal output terminal 162 from among the predetermined signals (i.e., the oil alert signal, engine start signal and overload signal) in the main panel 194*a* is detected.

The processing is explained taking as an example a case of connecting the engine 10 with the snowplow 164. Since the snowplow 164 requires the oil alert signal from among the predetermined signals, when the engine 10 is connected to the snowplow 164, the operator selects the "OIL ALERT SIGNAL" in the main panel 194*a*.

With this, the program proceeds to S12, in which it is determined whether the oil level is equal to or less than the predetermined level. The determination in S12 is done by detecting whether the oil-level switch 36 generates the ON signal. When the result in S12 is YES, the program proceeds to S14, in which the produced oil alert signal is forwarded to the signal output terminal 162, i.e., the FET 160 is turned ON. When the FET 160 is turned ON, as explained above, the indicator lamp 168 of the snowplow 164 is lit up to alter the operator. When the result in S12 is NO, the processing of S14 is skipped.

In the case of connecting the engine 10 with the high-pressure washing machine 172, the washing machine 172 requires the engine start signal from among the predetermined signals. When the engine 10 is connected to the high-pressure washing machine 172, therefore, the operator selects the "ENGINE START SIGNAL" in the main panel 194*a*.

With this, following S10, the program proceeds to S16, in which it is determined whether the switch 122 is turned ON, specifically, whether the operator pulls the trigger of the washing gun for inputting the instruction to start the engine 10. The determination in S16 is done by detecting the signal outputted from the detection circuit 126 and indicating that the switch 122 has been turned ON. When the result in S16 is NO, the remaining steps are skipped and when the result is YES, the program proceeds to S18, in which the produced engine start signal is forwarded to the signal output terminal 162, i.e., the FET 160 is turned ON. As a result, the auto-start system 176 of the washing machine 172 is operated to activate the starter motor 92, thereby starting the engine 10.

Next, the processing is explained taking as an example a case of connecting the engine 10 with the wood chipper 180. Since the wood chipper 180 requires the overload signal from among the predetermined signals, when the engine 10 is connected to the wood chipper 180, the operator selects the "OVERLOAD SIGNAL" in the main panel 194*a*.

With this, following S10, the program proceeds to S20, in which it is determined whether the current number of steps of the throttle motor 72 is equal to or greater than the first predetermined step reference STEPREF1. As explained above, this amounts to determination of whether the throttle opening θTH is equal to or greater than the predetermined opening limit. When the result in S20 is NO, the remaining steps are skipped and when the result is YES, the program proceeds to S22, in which the produced overload signal is forwarded to the signal output terminal 162, i.e., the FET 160 is turned ON. When the FET 160 is turned ON, as described in the foregoing, the relay 186 and hydraulic valve 184 of the wood chipper 180 are operated to stop the rotation of the roller, i.e., stop feeding wood.

Next, in S24, it is determined whether the number of steps of the throttle motor 72 is equal to or less than the second predetermined step reference STEPREF2. When the result in S24 is NO, the foregoing steps are repeated. When the result is YES, i.e., when the engine 10 is determined not to be in overload, the program proceeds to S26, in which the forwarding of the overload signal to the signal output terminal 162 is terminated, specifically the FET 160 is turned OFF. When the FET 160 is turned OFF, the relay 186 operates the hydraulic valve 184 to make the roller rotate, thereby resuming to feed wood.

As stated in the foregoing, in this embodiment of the invention, it is configured to have a general-purpose internal combustion engine (10) connectable to an operating machine (164, 172, 180) and having a cylinder (12) in which a piston (14) reciprocates to rotate a crankshaft (32) in a crankcase (30) where lubricant oil is retained and a throttle valve (68) for regulating air to be sucked in the cylinder, comprising: an electronic control unit (80) that controls operation of the operating machine when connected; a signal output terminal (162) that is installed in the electronic control unit and outputs a signal generated by the electronic control unit to the operating machine, and a signal selector (190) that selects a signal to be outputted by the signal output terminal from among signals in response to manipulation by an operator. The signal selector comprises a computer installed with appropriate software and a display.

Thus since it is configured such that the operator selects a signal to be outputted through the signal output terminal 162 from among the signals generated by the electronic control unit (ECU 80), it becomes possible to select a signal to be outputted from the signal output terminal 162 depending on a type of the connected operating machine, i.e., select a signal required by the operating machine. Because the engine 10 can select a signal required by the operating machine and output it through the signal output terminal 162 without a complicated electronic control unit or device, the operating machine can be easily connected to the engine 10, thereby enabling to improve in versatility and convenience. Further, the electronic control unit of the engine can be shared irrespective of a connected operating machine, thereby enhancing the cost performance.

In the embodiment, the signals include an oil alert signal outputted when the level of the oil is equal to or less than a predetermined level, an engine start signal outputted when an instruction to start the engine (10) is inputted, and an overload signal outputted when opening of the throttle valve (68) is equal to or greater than a predetermined throttle opening limit.

With this, it becomes possible to easily connect the engine 10 with various types of operating machines, such as the snowplow 164, high-pressure washing machine 172 and wood chipper 180, which require the oil alert signal, engine start signal, overload signal or other signals, thereby enabling to further improve in versatility and convenience.

The system further includes: a limit changer (190) that changes the predetermined throttle opening limit in response to manipulation by the operator. The limit changer comprises a computer installed with appropriate software and a display.

With this, in the case of connecting an operating machine which requires the overload signal, e.g., the wood chipper 180, the predetermined throttle opening limit can be appropriately changed depending on the operating machine, thereby reliably discriminating whether overload arises.

It should be noted that although the snowplow 164, high-pressure washing machine 172 and wood chipper 180 are taken as examples of operating machines connected to the engine 10, the invention should not be limited thereto and can be applied to another operating machine such as a generator. For instance, in the case where the engine 10 is connected to an emergency generator, it is configured such that an engine start button installed at the generator is connected to the switch 122 and the "ENGINE START SIGNAL" in the main panel 194*a* is to be selected. With this configuration, the engine start signal is outputted through the signal output terminal 162 even during the power outage, thereby enabling to start the engine 10.

It should also be noted that although it is configured such that the load condition of the engine 10 is determined based on the number of steps of the throttle stepper motor 72, it can be determined using the pulse signal indicative of the engine speed, which is generated from the output of the power coil 44.

It should further be noted that although it is configured to light up the indicator lamp 166 to alert the operator when the oil level does not exceed the predetermined level, other devices or sound may be utilized.

While the invention has thus been shown and described with reference to specific embodiments, it should be noted that the invention is in no way limited to the details of the described arrangements; changes and modifications may be made without departing from the scope of the appended claims.

What is claimed is:

1. A general-purpose internal combustion engine connectable to an operating machine and having a cylinder in which a piston reciprocates to rotate a crankshaft in a crankcase where lubricant oil is retained and a throttle valve for regulating air to be sucked into the cylinder, comprising:

an electronic control unit that controls operation of the operating machine when connected;

a signal output terminal that is installed in the electronic control unit and outputs a signal generated by the electronic control unit to the operating machine; and a signal selector that selects a signal to be outputted by the signal output terminal from among signals in response to manipulation by an operator;

wherein the signals include an oil alert signal outputted when level of the oil is equal to or less than a predetermined level, an engine start signal outputted when an instruction to start the engine is inputted, and an overload signal outputted when opening of the throttle valve is equal to or greater than a predetermined throttle opening limit.

2. The engine according to claim 1, wherein the signal selector comprises a computer and a display.

3. The engine according to claim 1, wherein the operating machine is one from among a snowplow, a washing machine and a wood chipper.

4. The engine according to claim 1, further including:

a limit changer that changes the predetermined throttle opening limit in response to manipulation by the operator.

5. The engine according to claim 4, wherein the limit changer comprises a computer and a display.

6. The engine according to claim 4, wherein the signal selector comprises a programmed computer, and the programmed computer also functions as the limit changer.

* * * * *